United States Patent [19]

Miller et al.

[11] Patent Number: 4,921,149

[45] Date of Patent: May 1, 1990

[54] ICE PORTION CONTROL FOR ICE DISPENSER AND METHOD

[75] Inventors: Benjamin D. Miller, Chicago; Thaddeus M. Jablonski, Palatine, both of Ill.

[73] Assignee: Remcor Products Company, Franklin Park, Ill.

[21] Appl. No.: 204,423

[22] Filed: Jun. 9, 1988

[51] Int. Cl.$^5$ .............................................. G01F 11/28
[52] U.S. Cl. .................................. 222/639; 222/643; 222/450; 222/504; 62/137
[58] Field of Search ................... 222/52, 54, 56, 63, 222/638-639, 641, 643, 233-235, 146.6, 504, 450; 62/137, 233, 344

[56] References Cited

U.S. PATENT DOCUMENTS

| | | | |
|---|---|---|---|
| 3,165,901 | 1/1965 | Weil et al. | 222/245 X |
| 3,211,338 | 10/1965 | Weil et al. | 222/643 |
| 3,217,509 | 11/1965 | Weil et al. | 222/227 X |
| 3,517,860 | 6/1970 | Whalen | 222/43 X |
| 4,227,377 | 10/1980 | Miller | 62/66 |
| 4,227,383 | 10/1980 | Horvay | 62/344 |
| 4,228,923 | 10/1980 | Barnard | 222/52 |
| 4,498,607 | 2/1985 | Jaschinski | 222/146.6 |
| 4,517,651 | 5/1985 | Kawasaki et al. | 222/641 X |
| 4,623,008 | 11/1986 | Shibata et al. | 141/89 |
| 4,771,609 | 9/1988 | Funabashi | 62/137 |
| 4,787,539 | 11/1988 | Uchida et al. | 222/639 |

Primary Examiner—Michael S. Huppert
Attorney, Agent, or Firm—Juettner Pyle Lloyd & Verbeck

[57] ABSTRACT

An ice portion control for an ice dispenser is characterized by a chute having an upper end for receiving ice and a lower end. With the chute filled with ice, to vend a desired quantity of ice a dispensing gate at the lower end of the chute is opened for a selected one of a plurality of timed periods of durations selected to dispense from the chute associated predetermined quantities of ice. Adjusting the lengths of the timed periods varies the quantities of ice vended.

28 Claims, 2 Drawing Sheets

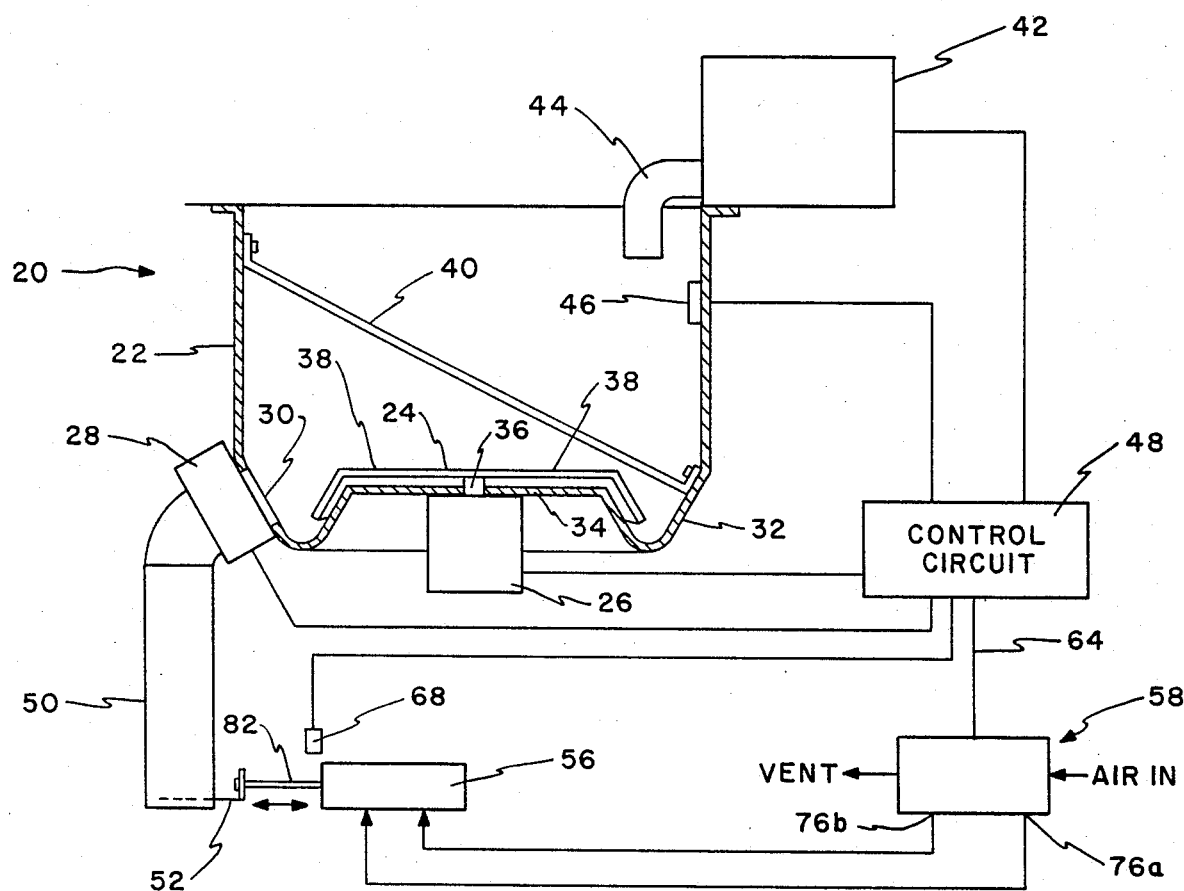
FIG. 1
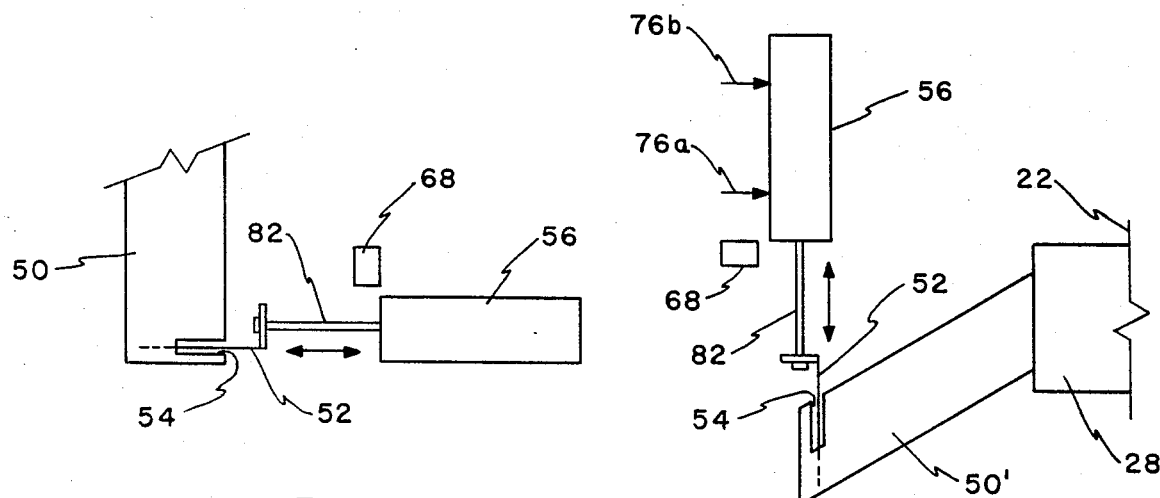
FIG. 1A
FIG. 2

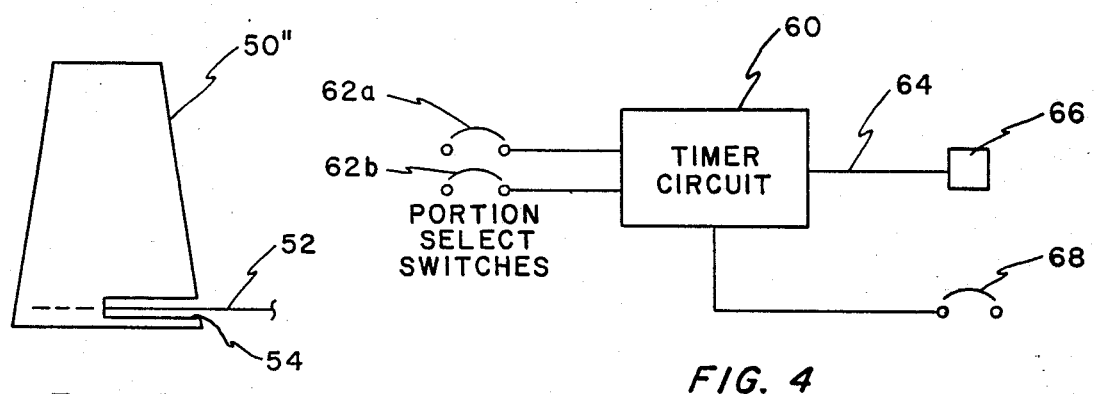
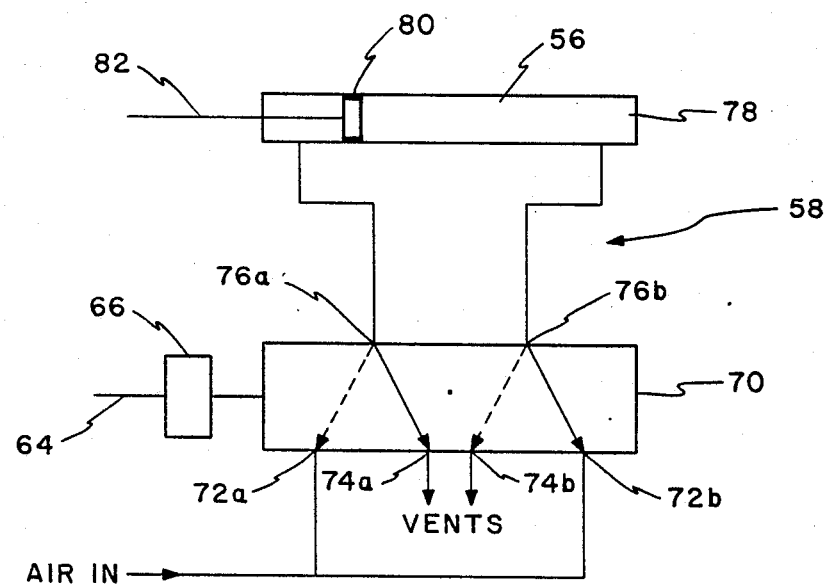
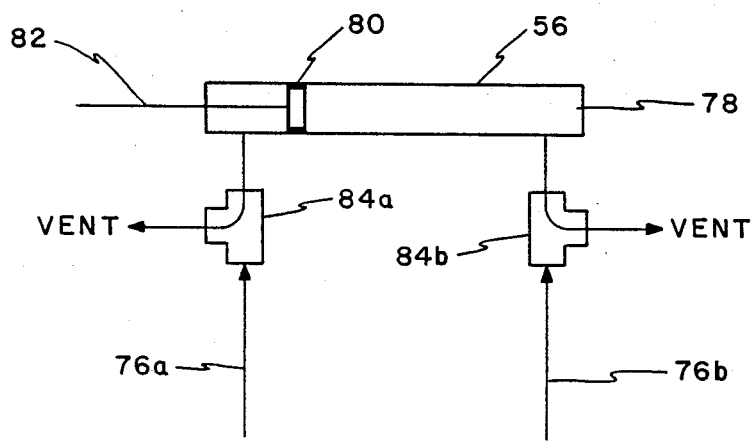

ICE PORTION CONTROL FOR ICE DISPENSER AND METHOD

BACKGROUND OF THE INVENTION

The present invention relates to ice dispensing, and in particular to an improved apparatus for and method of dispensing selected quantities of ice.

In the fast food and beverage service industries, it is desirable to provide means for conveniently dispensing quantities of ice into cups to facilitate service of a large number of cold beverages to customers in a relatively short period of time. It is also desirable to maintain repeatable quality and quantity of drinks from one to the next. In order to achieve these goals, it is necessary to have a means for automatically vending precise selected quantities or portions of ice into cups.

Typical ice dispensers consist of a hopper for storing a quantity of crushed, cracked, flaked or cubed ice bodies, a rotatable agitator in the hopper for preventing congealing of the ice and for urging ice out of the hopper during vending, and a single gate at and for controlling vending of ice through a dispensing opening from the hopper. When the gate is opened and the agitator rotated, ice exists the hopper opening for being vended into a cup. Operation of the dispenser may be controlled either by a cup operated lever or a hand operated button. In a common type of dispenser, ice is vended for as long as the lever or button is pressed, and stops when it is released.

In cases where it is desired to automatically dispense a measured quantity of ice, it has been customary to operate the dispenser gate by a timer circuit, such that the gate uncovers the hopper opening and dispensing occurs for a preset period of time in response to actuation of the operating lever or button. Such ice portion control systems have several advantages, including simplicity, ease of adjustment and flexibility to accommodate several different ice portions by pressing one of several operating levers or buttons to vary the timed dispensing period. A major disadvantages is that the accuracy with which selected quantities of ice may be dispensed is extremely limited, since the flow rate of ice out of the dispensing gate varies with the amount of ice in the hopper, with the orientation of the agitator arms to the hopper opening, and with the speed of rotation of the agitator. Also, some randomness in flow rate occurs naturally as to the ice bodies exiting the hopper opening. The resulting control over portion accuracy is found to be generally poorer than necessary for repeatable quality and quantity of drinks from one to the next.

To provide greater accuracy in the quantity of ice dispensed, there have recently been developed multiple gate systems that vend measured fixed volumes of ice, rather than timed portions. In such systems, a vertically oriented chute receives and is filled with ice from a hopper. A dispensing gate is at a lower end of the chute, and when closed supports the ice column in the chute. A plurality of portion control gates are located along the length of the tube, such that various fixed volumes of ice to be dispensed are determined by the quantity of ice in the chute between the lower dispensing gate and a selected one of the portion gates. To vend a selected quantity of ice, a predetermined one of the portion gates is extended into the chute and the lower dispensing gate is then opened, allowing the known volume of ice in the chute between the portion and dispensing gates to drop into a cup. This type of system provides ice portions of significantly more accurate quantities than the single gate timed portion system, and has been found to work successfully in applications that require repeatable and accurate ice portion dispensing. Two such measured volume dispensers are taught by U.S. Pat. Nos. 4,226,269 and 4,496,087. Disadvantages of such systems, however, include their relative complexity, inflexibility and lack of adjustability. A portion gate is required for each different ice quantity to be vended, and changing portion sizes involves mechanical adjustment of gate positions or a change in the cross section of the chute.

OBJECT OF THE INVENTION

The primary object of the present invention is to provide a portion control system for an ice dispenser, that can dispense measured quantities of ice with the accuracy of a measured volume system having portion gates, but has the flexibility and adjustment ease of a timed portion dispenser.

SUMMARY OF THE INVENTION

In accordance with the present invention, a portion control mechanism for an ice dispenser comprises chute means having an upper end for receiving ice bodies from a supply of ice bodies and a lower end for dispensing ice bodies therefrom. Also included are means for delivering ice bodies from the supply to the chute means upper end to fill the chute means with ice, and closure means for selectively closing the chute means lower end. In addition, means are provided for operating the closure means, when the chute means is filled with ice bodies, to remove the closure means from the chute means lower end for a selected one of a plurality of different timed periods of durations selected to dispense from the chute means lower end associated predetermined quantities of ice bodies previously delivered into the chute means.

The invention also contemplates a method of dispensing ice bodies from a chute having an upper end and a lower end. The method comprises the steps of closing the lower end of the chute, delivering ice bodies into the upper end of the chute to fill the chute, and then opening the chute lower end for a selected one of a plurality of different timed periods of durations selected to dispense from the chute lower end associated predetermined quantities of ice bodies previously delivered into the chute.

Other objects, advantages and features of the invention will become apparent upon a consideration of the following detailed description, when taken in conjunction with the accompanying drawings.

BRIEF DESCRIPTION OF THE DRAWINGS

FIG. 1 is a side elevation view, partly in cross section and partly in block diagram form, illustrating one embodiment of an ice portion control system according to the invention, for use with an ice hopper and icemaker of generally conventional construction;

FIG. 1A is a fragmentary side elevation view of the lower end of the ice delivery chute of FIG. 1, particularly illustrating a dispensing gate at the bottom of the chute;

FIG. 2 is a fragmentary side elevation view, showing a chute and dispensing gate arranged according to another embodiment of the invention;

FIG. 3 is a fragmentary side elevation view of a chute and dispensing gate according to a further embodiment of the invention;

FIG. 4 illustrates a timer circuit for controlling the duration of actuation of the dispensing gate in accordance with the quantity of ice to be vended;

FIG. 5 illustrates one embodiment of pneumatic circuit for operating the dispensing gate, and FIG. 6 illustrates a portion of another embodiment of pneumatic circuit for operating the dispensing gate.

DETAILED DESCRIPTION

In FIG. 1 an ice dispenser, indicated generally at 20, to the extent conventional is comprised of a hopper 22 for storing a large quantity of crushed, cracked, flaked or cubed ice, such as fifty pounds of ice, a rotary impeller or agitator 24 driven by an electric motor 26, and gate means 28 for accommodating discharge of ice from the hopper through a lower hopper opening 30. The gate means may take the form of any of the dispensing gates disclosed in U.S. Pat. Nos. 3,165,901, 3,211,338 and 3,217,509, to which reference is made for a more detailed description. In essence, the gate means includes a gate that is selectively movable between positions uncovering and covering the hopper opening 30 to establish and interrupt a path for a flow of ice bodies from the hopper through the opening and gate means.

The hopper 22 is essentially an open top tub, the major part of which comprises a main upper hopper portion which may be of circular or other cross section, but preferably is of polygonal cross section, as disclosed in U.S. Pat. No. 3,517,860, to facilitate maintaining the ice bodies in discrete, free-flowing form. The bottom of the hopper has a circular depression comprising an annular trough 32 in which the discharge opening 30 is formed. The opening is spaced a short distance above the bottom of the trough, and the trough is provided at its bottom with melt water drain holes (not shown), so that only discrete particles of relatively dry ice pass through the opening. The bottom of the hopper is closed by an end wall 34, so that ice to be discharged gravitates into and is confined within the trough.

The hopper bottom wall 34 is centrally apertured for upward, liquid sealed passage of a shaft 36 of the drive motor 26, the motor being mounted on the bottom wall exteriorly of the hopper. Carried on the shaft within the interior of the hopper is the agitator 24 which has a plurality of radial arms 38 that generally follow the contour of the bottom wall and extend into the trough and engage the mass of ice in the hopper to cause the same to rotate. A rod 40 may extend from side to side and top to bottom within the hopper to provide a fixed resistance against which the rotating mass of ice is moved to facilitate agitation and separation thereof into discrete particles. The motor 26 may comprise an electric gear motor that is operated for a short interval of time, when the gate means 28 uncovers the opening 30, to assist a flow of ice bodies through the opening.

To maintain a supply of ice in the hopper 22 and to replenish ice removed therefrom, an icemaker 42 has an ice outlet spout 44 in communication with the open upper end of the hopper. The icemaker may be of any conventional type, and provides crushed, cracked, flaked or cubed ice pieces to the hopper.

To control operation of the icemaker 42 in order to maintain ice in the hopper 22 at a selected level, a thermostat 46 is on an inside wall of the hopper below the icemaker spout 44 and at the level at which ice is to be maintained, and senses the presence or absence of ice therearound. The thermostat is connected with a control circuit 48 for operating the icemaker, and also connected with the control circuit are the agitator motor 26 and gate means 28. The control circuit operates the icemaker, in response to signals from the thermostat, in a manner to maintain ice in the hopper at a level about equal to that of the thermostat. The control circuit maintains the hopper full of ice according to any conventional control scheme, such for example as that described in U.S. Pat. No. 4,227,377.

The ice dispenser 20 is for vending ice into cups. If operated according to one conventional scheme, the control circuit 48 would operate the gate means 28 to uncover the hopper opening 30 and would simultaneously energize the motor 26 to rotate the agitator 24 to urge ice in the hopper 22 through the opening 30 and the gate means, with ice exiting the gate means being vended into a cup. The dispensing operation would normally be initiated by either a cup operated lever or hand operated button, and ice would be dispensed for as long as the lever or button were pressed. Upon release of the lever or button, the control circuit would deenergize the motor and operate the gate means to cover the hopper opening and terminate vending.

If the ice dispenser 20 were operated according to another conventional scheme for automatic ice portion control, then the control circuit 48 would include a timer circuit for controlling opening of the gate means 28 and operation of the agitator 24, such that vending would occur for a preset period of time, irrespective of how long the operating lever or button were pressed. A significant disadvantage of the technique, however, is that it allows only very limited control over the sizes of ice portions dispensed. Such inaccuracies in ice quantities dispensed occur because the gate means is at the hopper opening 30 and the rate of ice flow out of the opening varies with the amount of ice in the hopper, with the orientation of the agitator arms 38 to the opening, and with variations in the speed of rotation of the agitator 24, which variables cannot be accounted for in selecting preset dispensing times. Also, some randomness occurs naturally as to the ice pieces exiting the hopper opening. The resulting control over ice portion size is often poorer than required to maintain repeatable quality and quantity of drinks from one to the next.

In overcoming the disadvantages of prior ice dispensing techniques, the invention provides an ice portion control system for dispensing ice with the accuracy of a measured volume system using dispensing and portion gates, but with the flexibility and adjustment ease of a timed portion system having only a single gate at the hopper opening. As seen in FIGS. 1 and 1A, in one embodiment the portion control system consists of a vertical chute or tube 50 connected at its upper end to an outlet from the gate means 28, and a lower gate or closure means 52 for selectively closing and opening a lower outlet end of the chute. The closure means may advantageously take the form of a flat plate, and is movable into and out of the lower end of the chute through a generally hemispherical slot 54. The closure means may be moved by any suitable device capable of moving it quickly and with sufficient force, such as by a pneumatic cylinder 56 operated by a pneumatic circuit 58 in response to signals from the control circuit 48.

In operation of the ice portion control system, the chute 50 is filled with ice bodies prior to vending. To that end, with the closure means 52 inserted into and closing the lower end of the chute, the control circuit 48 operates the gate means 28 and agitator motor 26 to open the gate means and rotate the agitator 24 for a limited time sufficient to deliver ice bodies from the hopper 22 into the upper end of the chute to fill the chute. The gate means is then closed and the agitator motor deenergized, so that the ice bodies in the filled chute are separated or isolated from and not acted upon by the weight of ice in the hopper. Filling the chute may take place either immediately before or following vending.

To vend a predetermined quantity of ice into a cup placed beneath the lower end of the ice filled chute 50, the control circuit 48 causes the pneumatic circuit 58 to operate the pneumatic cylinder 56 to remove the closure means 52 from the bottom of the chute for a timed period of a duration selected to allow the predetermined quantity of ice bodies to exit the bottom of the chute under the influence of gravity. At the end of the timed period, the control circuit causes the pneumatic circuit to operate the pneumatic cylinder to reinsert the closure means into the bottom of the chute to terminate vending. The duration of the period for which the closure is withdrawn from the chute lower end determines the quantity of ice dispensed. Adjusting the duration varies the quantity of ice vended.

Ice falls out of the chute 50 solely under its own weight, so the rate at which it falls out is very repeatable. This allows very accurate control over the size of ice portions dispensed, with the size being directly determined by the time for which the closure means 52 is removed from the lower end of the chute. The volume of the chute is not critical, but it must hold at least as much ice as the largest portion size to be dispensed, since during a vending operation only ice previously delivered into and contained in the chute is vended.

In a preferred embodiment of portion control system the gate means 28 is not used, and the upper end of the chute 50 connects directly with the hopper opening 30. In operation of the system, the chute is filled with ice bodies prior to vending. With the closure means 52 inserted into and closing the chute lower end, the control circuit 48 operates the agitator motor 26 to rotate the agitator 24 for a limited time sufficient to deliver ice from the hopper 22 into the upper end of the chute to fill the chute. Filling the chute may take place either immediately before or following vending.

To vend a predetermined quantity of ice into a cup placed beneath the lower end of the ice filled chute 50, the control circuit 48 causes the pneumatic circuit 58 to operate the pneumatic cylinder 56 to remove the closure means 52 from the bottom of the chute for a timed period of a duration selected to allow the predetermined quantity of ice bodies to exit the bottom of the chute under the influence of gravity. The agitator 24 is not rotated during vending, and at the end of the timed period the control circuit causes the pneumatic circuit to operate the pneumatic cylinder to move the closure means back into the bottom of the chute to terminate vending. The duration of the period for which the closure means is withdrawn from the chute lower end determines the quantity of ice dispensed.

Although for this embodiment the gate means 28 is not used, when the closure means 52 is opened, ice nevertheless falls out of the chute 50 solely under its own weight. This occurs because ice bodies in the hopper 22 do not flow through the hopper opening 30 into the upper end of the chute as readily as they flow out of the chute lower end. Consequently, when the closure means is opened, any ice flow into the upper end of the chute is slower than the flow rate of ice out of the lower end of the chute, so the rate at which ice falls out of the chute is very repeatable. Very accurate control may therefore be maintained over the size of ice portions dispensed, with the size being directly determined by the time for which the closure means is removed from the lower end of the chute. As for the previously described embodiment, the volume of the chute is not critical, but it must hold at least as much ice as the largest portion size to be dispensed, since during a vending operation only ice previously delivered into and contained in the chute is vended.

The control circuit 48 includes a timer circuit for controlling the duration of the period for which the closure means 52 is withdrawn from the lower end of the chute 50. Any suitable timer circuit may be used, such as a timer circuit 60 of FIG. 4. The timer circuit is responsive to actuation of a selected one of a plurality of portion select switches, only switches 62a–b of which are shown, to generate at an output 64 a timing pulse of a duration in accordance with the particular switch actuated. The portion select switches may be actuated by associated cup operated levers or hand operated buttons, each representative of a particular size ice portion to be vended. Any number of different size portions may be vended simply by providing timing pulses of different selected durations. The timing pulses are applied to an electric solenoid 66 of the pneumatic circuit 58 (see FIG. 5 also) to cause the circuit to operate the pneumatic cylinder 56 to withdraw the closure means from the chute for the duration of the pulses.

To avoid inaccuracies that may occur in the sizes of ice portions vended, as a result of mechanical lag in the system, a sensor 68 may be used to detect the position of the closure means 52. The sensor can be of any suitable type, such as a mechanical, photoelectric or magnetic switch that is capable of sensing the position of the closure means and transmitting a "start" signal to the timer circuit 60 when the closure means has been withdrawn from the bottom of the chute 50 by at least a selected amount, such as when it is fully or almost fully withdrawn. In this case, upon actuation of a portion select switch 62a–b, the timer circuit will generate an output to energize the solenoid 66 of the pneumatic circuit 58, but timing of the selected duration of the output signal will not begin until occurrence of the start signal from the sensor. By delaying the beginning of the timed duration for which the closure means is opened, until it has actually been opened by a selected amount, any inaccuracies resulting from mechanical lag in the system are eliminated.

The required timing is very fast, usually on the order of 0.1 to 0.3 seconds for typical ice portion sizes. It is therefore necessary that the pneumatic portion of the system be capable of operating the closure means 52 very quickly. It is also necessary that the pneumatic portion be capable of moving the closure means with a force sufficient to rapidly withdraw it from beneath the column of ice in the chute 50 at the beginning of a vending operation, and to then rapidly reinsert it into the chute and through falling ice to terminate vending. The pneumatic cylinder 56 provides the necessary speed and force for moving the closure means, and one contemplated embodiment for the pneumatic circuit 58 is shown in FIG. 5. The pneumatic circuit includes a shuttle valve 70 operated by the solenoid 66 in response to timing pulses at the outlet 64 from the timer circuit 60. The shuttle valve has a pair of inlets 72a–b connected to a supply of compressed air, a pair of vents 74a–b and a pair of inlet/outlets 76a–b coupled to a cylinder portion 78 of the pneumatic cylinder to opposite sides of a piston 80. In the illustrated state of the shuttle valve, the piston is moved to the left (as shown in FIG. 5) and the closure means is extended into the chute by a piston rod 82. Upon energization of the solenoid by the timer circuit at the beginning of a vending operation, the state of the shuttle valve is changed as shown in dashed lines, and the piston is moved to the right to withdraw the closure means from the chute.

FIG. 6 illustrates a modification of the pneumatic circuit 58, in which "quick vent" fittings are in-line between the shuttle valve inlets/outlets 76a–b and the pneumatic cylinder 56. The quick vent fittings are located close to the pneumatic cylinder, and each is characterized in that compressed air from the shuttle valve is coupled to the pneumatic cylinder, while in the absence of compressed air from the shuttle valve, air in the pneumatic cylinder is vented by the fittings. The quick vent fittings shorten the vent paths and therefore the response time of the pneumatic cylinder.

FIGS. 2 and 3 illustrate other contemplated embodiments of the chute 50 and closure means 52. The chute need not be vertical, but as seen in FIG. 2 the chute 50' may be downwardly angled and the closure means vertically oriented, which may provide a more desirable physical arrangement in some applications. As seen in FIG. 3, the chute also need not be of uniform cross section along its length, but instead the chute 50" may have a diverging cross section from top to bottom to ensure a fast release of ice bodies therein by preventing any "bridging" effect.

While embodiments of the invention have been described in detail, various modification and other embodiments thereof may be devised by one skilled in the art without departing from the spirit and scope of the invention, as defined in the appended claims.

What is claimed is:

1. An ice dispenser, comprising chute means having an upper end for receiving ice bodies from a supply of ice bodies and a lower end for dispensing ice bodies therefore; means selectively operable for delivering ice bodies from the supply to said chute means upper end to fill said chute means with ice; closure means for selectively closing said chute means lower end; and means for operating said closure means and said delivering means, when said chute means is filled with ice bodies, to remove said closure means from said chute means lower end, while rendering said delivering means inoperative, for a selected one of a plurality of different timed periods of durations selected to dispense from said chute means lower end associated predetermined quantities of ice bodies previously delivered into said chute means.

2. An ice dispenser as in claim 1, including a hopper for storing the supply of ice bodies, said hopper having an opening through which ice bodies flow from said hopper for delivery to said chute means upper end, wherein said delivering means includes gate means operable by said means for operating to establish communication between said hopper opening and chute means upper end for a flow of ice bodies through said opening into said upper end to fill said chute means and, when said chute means is filled and whenever said closure means is removed from said chute means lower for dispensing ice, to interrupt communication between said hopper opening and said chute means upper end to isolate ice in said chute means from the supply of ice in said hopper.

3. An ice dispenser as in claim 1, including a hopper for storing the supply of ice bodies, said hopper having an opening through which ice bodies flow from said hopper for delivery to said chute means upper end, wherein said delivering means includes an agitator for urging ice bodies in said hopper through said opening to said chute means upper end to fill said chute means, said agitator being rendered inoperable to urge ice through said opening when ice is being dispensed from said chute means.

4. An ice dispenser as in claim 1, wherein said closure means comprises a gate movable into and out of said chute means lower end to close and open said lower end, and said operating means includes pneumatically operated means for moving said gate into and out of said chute means lower end.

5. An ice dispenser, comprising hopper means for storing a mass of ice bodies; chute means having an upper end for receiving ice bodies delivered through an opening in said hopper means and a lower end for dispensing ice bodies therefrom; means for delivering ice bodies from said hopper means through said opening into said chute means upper end; closure means movable between open and closed states to open and close said chute means lower end; and means for operating said delivering means and closure means to (1) place said closure means in its closed state and enable said delivering means to deliver ice bodies from said hopper means into said chute means upper end to fill said chute means with ice bodies, (2) disable said delivering means after said chute means is filled with ice bodies, (3) place said closure means in its open state, while continuing to disable said delivering means, for a selected one of a plurality of different timed periods of durations selected to dispense from said chute means lower end predetermined quantities of ice bodies, previously delivered into said chute means, in accordance with the duration of the selected timed period, and then (4) place said closure means in its closed state at the end of the selected period.

6. An ice dispenser as in claim 5, wherein said closure means comprises an element selectively insertable laterally into said chute means lower end to prevent movement of ice bodies in said chute means downwardly therepast.

7. An ice dispenser as in claim 6, wherein said operating means includes pneumatically operated means for selectively inserting said element into and removing said element from said chute means lower end.

8. An ice dispenser as in claim 5, wherein said chute means is elongate and extends generally vertically.

9. An ice dispenser as in claim 5, wherein said chute means is elongate and is inclined downwardly, at an angle to vertical, from said hopper means opening.

10. An ice dispenser as in claim 5, wherein said chute means increases in cross sectional area between said upper and lower ends thereof.

11. An ice dispenser as in claim 5, wherein said delivering means includes agitator means in said hopper means, said agitator means being actuable to assist movement of ice bodies in said hopper means through said hopper means opening, said operating means enabling said agitator means, when said closure means is placed in its closed state, to assist in delivery of ice bodies through said hopper means opening into said chute means upper end, and disabling said agitator means, when said closure means is placed in its open state, from assisting in delivery of ice bodies through said hopper means opening into said chute means upper end.

12. An ice dispenser as in claim 5, including gate means movable between open and closed states to establish and interrupt communication between said hopper means opening and chute means upper end, said operating means operating all of said gate means, closure means and delivering means to (1) place said gate means in its open state, place said closure means in its closed state and enable said delivering means to deliver ice bodies from said hopper means into said chute means upper end to fill said chute means with ice bodies, (2) place said gate means in its closed state and disable said delivering means after said chute means is filled with ice bodies, (3) place said closure means in its open state, while maintaining said gate means in its closed state, for a selected one of a plurality of different timed periods of durations selected to dispense from said chute means lower end predetermined quantities of ice bodies in accordance with the duration of the selected timed period, and then (4) place said closure means in its closed state at the end of the selected period.

13. An ice dispenser as in claim 12, wherein said gate means, when placed in its closed state, isolates ice bodies in said chute means from ice bodies in said hopper means.

14. An ice dispenser as in claim 5, including a plurality of ice portion size selection switches, each actuable to cause said operating means to place said closure means in its open state for an associated selected one of said timed periods.

15. An ice dispenser as in claim 5, said operating means including timer means for timing each of said plurality of timed periods of selected duration, and including sensor means for detecting the amount by which said closure means has been moved to its open state and for causing said timer means to begin timing the selected period only upon said closure means being moved at least a predetermined amount toward its open state.

16. A method of dispensing ice bodies from a chute having an upper end and a lower end, comprising the steps of closing the lower end of the chute; delivering ice bodies into the upper end of the chute to fill the chute; and then opening the lower end of the chute for a selected one of a plurality of different timed periods of durations selected to dispense from the chute lower end associated predetermined quantities of ice bodies previously delivered into the chute.

17. A method as in claim 16, wherein said delivery step comprises placing the chute upper end into communication with a supply of ice bodies.

18. A method as in claim 17, including the step, following said delivery step and prior to said step of opening the chute lower end, of interrupting communication between the chute upper end and the supply.

19. A method of dispensing ice bodies from a chute having an upper end for receiving ice bodies and a lower end for dispensing ice bodies therefrom, comprising the steps of closing the lower end of the chute; establishing communication between the upper end of the chute and a supply of ice bodies for delivery of ice bodies from the supply into the chute upper end to fill the chute with ice bodies; opening the chute lower end for a selected one of a plurality of different timed periods of durations selected to dispense from the chute lower end associated predetermined quantities of ice bodies previously delivered into the chute; and closing the chute lower end at the end of the selected timed period.

20. A method as in claim 19, including the step, following said establishing communication step and before said step of opening the chute lower end, of interrupting communication between the chute upper end and the supply of ice bodies.

21. A method as in claim 20, wherein said step of interrupting communication isolates the supply of ice bodies from the ice bodies in the filled chute.

22. A method as in claim 19, including the step of orienting the chute generally vertically.

23. A method as in claim 19, including the step of orienting the chute so that it is inclined downwardly at an angle to vertical.

24. A method as in claim 19, including the step of providing the chute with a cross sectional area that increases from its upper to its lower end.

25. A method as in claim 19, including the step, performed concurrently with said establishing communication step, of urging ice bodies from the supply into the chute upper end.

26. A method of operating an ice dispenser having a hopper for storing a mass of ice bodies, a delivery chute having an upper end for receiving ice bodies delivered through an opening in the hopper and a lower end for dispensing ice bodies therefrom, and a closure movable between open and closed states to open and close the lower end of the chute, said method comprising the steps of placing the closure in its closed state; delivering ice bodies from the hopper through the hopper opening and into the chute upper end to fill the chute; placing the closure in its open state for a selected one of a plurality of different timed periods of durations selected to dispense from the chute lower end associated predetermined quantities of ice previously delivered into the chute; and placing the closure in its closed state at the end of the selected timed period to terminate dispensing of ice from the chute lower end.

27. A method as in claim 26, wherein the ice dispenser also has a gate movable between open and closed states to establish and interrupt communication between the chute upper end and hopper opening, including the step of placing the gate in its open state during said delivering step, and placing the gate in its closed state immediately following said delivering step.

28. A method of dispensing ice bodies from a chute having an upper end and a lower end, comprising the steps of closing the lower end of the chute, placing the upper end of the chute into communication with a supply of ice for a flow of ice from the supply into the upper end to fill the chute; and then opening the lower end of the chute for a selected one of a plurality of different timed periods of durations selected to dispense from the chute lower end associated predetermined quantities of the ice bodies previously flowed into the chute while causing the flow rate of any ice from the supply into the chute upper end to be less than the flow rate of ice being dispensed from the chute lower end.

* * * * *